US007210094B2

(12) United States Patent
Dovin et al.

(10) Patent No.: US 7,210,094 B2
(45) Date of Patent: Apr. 24, 2007

(54) METHOD AND SYSTEM FOR DYNAMIC WEB PAGE BREADCRUMBING USING JAVASCRIPT

(75) Inventors: William M. Dovin, Brackney, PA (US); James R. Kunz, Maine, NY (US)

(73) Assignee: International Business Machines Corporation, Armonk, NY (US)

( * ) Notice: Subject to any disclaimer, the term of this patent is extended or adjusted under 35 U.S.C. 154(b) by 763 days.

(21) Appl. No.: 09/903,046

(22) Filed: Jul. 11, 2001

(65) Prior Publication Data

US 2003/0018665 A1 Jan. 23, 2003

(51) Int. Cl.
G06F 17/00 (2006.01)
G06F 3/00 (2006.01)
G06F 15/16 (2006.01)

(52) U.S. Cl. .................... 715/501.1; 715/513; 715/854; 715/855; 709/203

(58) Field of Classification Search ................ 715/513, 715/501.1, 514, 854, 764, 855; 709/223, 709/203, 224, 227; 707/104.1
See application file for complete search history.

(56) References Cited

U.S. PATENT DOCUMENTS

| | | | |
|---|---|---|---|
| 5,712,979 A * | 1/1998 | Graber et al. ............... | 709/224 |
| 5,717,860 A * | 2/1998 | Graber et al. ............... | 709/227 |
| 5,742,768 A | 4/1998 | Gennaro et al. | |
| 5,806,077 A * | 9/1998 | Wecker ..................... | 715/501.1 |
| 5,911,145 A | 6/1999 | Arora et al. | |
| 5,964,836 A | 10/1999 | Rowe et al. | |
| 6,069,630 A | 5/2000 | Lisle et al. | |
| 6,138,150 A | 10/2000 | Nichols et al. | |
| 6,144,962 A | 11/2000 | Weinberg et al. | |
| 6,148,311 A | 11/2000 | Wishnie et al. | |
| 6,161,127 A | 12/2000 | Cezar et al. | |
| 6,182,072 B1 | 1/2001 | Leak et al. | |

(Continued)

OTHER PUBLICATIONS

Whitewater.be, "Breadcrumbing using cookies," Feb. 16, 2003, pp. 1-2, http://www.whitewater.be/script/result.asp?action=view&id=82.*

(Continued)

Primary Examiner—Stephen Hong
Assistant Examiner—Adam L. Basehoar
(74) Attorney, Agent, or Firm—Scully, Scott, Murphy & Presser, P.C.; William E. Schiesser (57) ABSTRACT

According to the present invention, there are provided a dynamic client-side breadcrumbing method and system for improving navigation of a plurality of web pages within a Website. The method and system comprise executing a breadcrumbing engine embedded into a web page for: generating a breadcrumb for each web page downloaded to a web browser associated with a client from a web server associated with the Website, the generated breadcrumb including navigation information for each downloaded web page; storing breadcrumbs associated with web pages downloaded to the web browser at the client; updating the stored breadcrumbs with the generated breadcrumb to form a breadcrumb navigation trail of breadcrumbs associated with navigation of the web pages at the Website; and displaying the breadcrumb navigation trail on each downloaded web page for user selection. The method and system further comprise resuming navigation according to the breadcrumb navigation trail by downloading of a web page according to navigation information of a last breadcrumb in the breadcrumb navigation trail.

19 Claims, 6 Drawing Sheets

U.S. PATENT DOCUMENTS

| | | | |
|---|---|---|---|
| 6,182,140 B1 | 1/2001 | Feig et al. | |
| 6,243,091 B1* | 6/2001 | Berstis | 715/839 |
| 6,412,008 B1* | 6/2002 | Fields et al. | 709/228 |
| 6,557,015 B1* | 4/2003 | Bates et al. | 715/501.1 |
| 6,633,316 B1* | 10/2003 | Maddalozzo et al. | 715/854 |
| 6,667,751 B1* | 12/2003 | Wynn et al. | 715/833 |
| 6,810,395 B1* | 10/2004 | Bharat | 707/4 |
| 6,820,111 B1* | 11/2004 | Rubin et al. | 709/203 |
| 6,886,034 B2* | 4/2005 | Blumberg | 709/217 |
| 2002/0075331 A1* | 6/2002 | Orbanes et al. | 345/854 |
| 2005/0132018 A1* | 6/2005 | Millic-Frayling et al. | 709/213 |

OTHER PUBLICATIONS

Yahoo Screen Pages, Oct. 5, 1999, pp. 1-5, http://web.archive.org/web/19991005031700/http://dir.yahoo.com/Arts/Artists/Masters/Directories/.*

Privacy Compliance Resources, "Cookies," Feb. 10, 2001, pp. 1, http://web.archive.org/web/20010210192514/http://www.idcide.com/pages/res_term.htm.*

Lee Underwood, "How to Create a JavaScript Breadcrumb Script", Jan. 31, 2005, pp. 1-4, http://webreference.com/js/scripts/breadcrumbs/.*

Coggeshall, John, "Breadcrumb Navigation", Apr. 10, 2001, pp. 1-4, http://www.zend.com/zend/spotlight/breadcrumb28.php.*

* cited by examiner

METHOD AND SYSTEM FOR DYNAMIC WEB PAGE BREADCRUMBING USING JAVASCRIPT

BACKGROUND OF THE INVENTION

1. Technical Field of the Invention

The present invention generally relates to navigation within a Website. More particularly, the present invention is directed to a method and system for dynamically generating and maintaining a client-side breadcrumb navigation trail for improving navigation of a plurality of web pages within a Website.

2. Description of the Prior Art

Navigation within a Website generally falls within a simple linear navigation architecture, or the more complex breadth-emphasizing and/or depth-emphasizing navigational architectures. Invariably, a well-designed Website on the World Wide Web (i.e., "WWW") and more generally on the Internet, adheres to a navigational architecture that enables a user to easily navigate through the Website's information space (i.e., plurality of web pages). The breadth-emphasizing navigation structure reminds the user of the full array of information within its information space. That is, such a structure depicts all top levels of the Website (i.e., categories) on a particular web page of the Website (i.e., as links to those top level web pages), such as at the left margin of the web page running the length of the web page or across the top of the web page running from the left margin to the right margin. The depth-emphasizing navigation structure depicts a hierarchical path through the information space from broader categories through more narrower categories through to a final web page, i.e., displaying links from a home page of the Website through a plurality intermediary web pages representing categories (i.e., child web pages) to the current page (i.e., also a child web page) atop the current web page as breadcrumbs, i.e., breadcrumb navigation. Particular web sites that implement breadcrumb navigation include CNET.com, Yahoo.com, ZDNnet.com, Sun.com, and the like.

Presently, myriad web sites implement breadcrumb navigation within their websites. Breadcrumbs are HyperText Markup Language (i.e., HTML") links that are displayed atop of web pages of a Website that link users to web pages that the user navigated through while at the Website. Furthermore, the links are displayed in order from a first web page (i.e., parent page) to subsequently visited web pages (i.e., child web pages). For example, the following links represent breadcrumb navigation from a parent web page to a plurality of subsequent web pages: "Home>Computers>Software>Internet>TCP/IP". In the foregoing example of breadcrumb navigation, a user is presented with all of the pages that the user has visited from the parent web page "Home" to the current child web page "TCP/IP" in the information space of the Website. It should be noted that all of the pages except the last page "TCP/IP" are HTML links, since the last page represents a web page that is currently displayed. If, for example, the user were to click on the "Computers" link, a child web page associated with this link would include the following breadcrumb navigation "Home>Computers". Thus, a user is enabled to traverse the visited web pages of a Website via the links atop each of the web pages by clicking on the appropriate link associated with a visited web page. Separators that distinguish one link from another generally include: ">", "→", "/" and the like.

Different breadcrumbing methods are known in the art. One of the methods hard codes breadcrumbs as static links in web pages requested by a user (i.e., hard-coded breadcrumbing). Another method implements breadcrumbs generated, maintained and inserted into web pages by a Website server (i.e., server-side breadcrumbing) and transmitted to the user requesting the web pages. Both of the foregoing methods provide for navigation of the Website's information space (i.e., plurality of web pages at the Website) for the user. A deficiency of the hard-coded breadcrumbing method is that the breadcrumbs (i.e., HTML links) may not accurately reflect correct order, link name and associated web pages for the navigation structure through the information space of the Website. That is, in order to correctly reflect the user's navigation through the Website's information space, breadcrumbs must be maintained and updated as the Website changes, i.e., changes occurring in the web page organization including renaming, deleting, adding and moving web pages within the Website. A deficiency of the server-side breadcrumbing is that such an implementation places an inordinate load on the server in terms of execution time and storage space required to satisfy all user requests for web pages utilizing breadcrumbs.

Therefore there is a need in the art for dynamic client-side breadcrumbing for abating deficiencies of the prior art breadcrumbing systems requiring hard coding of the breadcrumbs or placing a load upon the Website's server resources for performing breadcrumbing.

SUMMARY OF THE INVENTION

It is therefore an object of the present invention to provide a system and method for dynamically generating breadcrumbs for web pages requested by a plurality of users.

It is another object of the present invention to provide a system and method for dynamically maintaining breadcrumbs.

It is yet another object of the present invention to provide a system and method for dynamically maintaining client-side breadcrumbs.

It is a further object of the present invention to provide a system and method for facilitating the plurality of users to navigate a Website utilizing the dynamically generated and maintained breadcrumbs.

It is yet a further object of the present invention to provide a system and method for facilitating users to utilize the dynamically generated and maintained breadcrumbs to resume navigation where they left off upon revisiting the Website.

According to an embodiment of the present invention, there is provided a dynamic client-side breadcrumbing method for improving navigation of a plurality of web pages within a Website, the method comprising: generating a breadcrumb for each web page downloaded to a web browser associated with a client from a web server associated with the Website, the generated breadcrumb including navigation information for each downloaded web page; storing breadcrumbs associated with web pages downloaded to the web browser at the client; updating the stored breadcrumbs with the generated breadcrumb to form a breadcrumb navigation trail of breadcrumbs associated with navigation of the web pages at the Website; and displaying the breadcrumb navigation trail on each downloaded web page for user selection.

According to another embodiment of the present invention, there is provided a dynamic client-side breadcrumbing system for improving navigation of a plurality of web pages within a Website, the system comprising: a web server associated with the Website transmitting web pages requested by a client, the web pages embedding a breadcrumbing engine; and a web browser associated with the client downloading the web pages and executing the breadcrumbing engine, the breadcrumbing engine for: generating a breadcrumb for each web page downloaded to the web browser, the generated breadcrumb including navigation information for each downloaded web page, storing breadcrumbs associated with web pages downloaded to the web browser at the client, updating the stored breadcrumbs with the generated breadcrumb to form a breadcrumb navigation trail of breadcrumbs associated with navigation of the web pages at the Website, and displaying the breadcrumb navigation trail on each downloaded web page for user selection.

According to yet another embodiment of the present invention, there is provided. A program storage device, tangibly embodying a program of instructions executable by the machine to perform a dynamic client-side breadcrumbing method for improving navigation of a plurality of web pages within a Website, the method comprising: generating a breadcrumb for each web page downloaded to a web browser associated with a client from a web server associated with the Website, the generated breadcrumb including navigation information for each downloaded web page; storing breadcrumbs associated with web pages downloaded to the web browser at the client, updating the stored breadcrumbs with the generated breadcrumb to form a breadcrumb navigation trail of breadcrumbs associated with navigation of the web pages at the Website; and displaying the breadcrumb navigation trail on each downloaded web page for user selection.

According to still another embodiment of the present invention, there is provided a dynamic client-side breadcrumbing method for improving navigation of a plurality of web pages within a Website, the method comprising: storing breadcrumbs associated with web pages downloaded to a web browser from a web server associated with the Website at the client, the breadcrumbs including navigation information associated with downloaded web pages and forming a breadcrumb navigation trail of breadcrumbs associated with navigation of the web pages at the Website; setting a time stamp corresponding to the breadcrumb navigation trail and storing the time stamp at the client; downloading a subsequent web page and retrieving the time stamp corresponding to the breadcrumb navigation trail stored at the client; determining whether a time interval between the time stamp and a time corresponding to the subsequent downloaded web page exceeds a threshold; and enabling resumption of navigation according to the breadcrumb navigation trail by enabling downloading of a web page according to navigation information of a last breadcrumb in the breadcrumb navigation trail and displaying the breadcrumb navigation trail on the downloaded web page if the time interval exceeds the threshold.

According to still yet another embodiment of the present invention, there is provided a dynamic client-side breadcrumbing system for improving navigation of a plurality of web pages within a Website, the system comprising: a web server associated with the Website transmitting web pages requested by a client, the web pages embedding a breadcrumbing engine; and a web browser associated with the client downloading the web pages and executing the breadcrumbing engine, the breadcrumbing engine for: storing breadcrumbs associated with web pages downloaded to a web browser from a web server associated with the Website at the client, the breadcrumbs including navigation information associated with downloaded web pages and forming a breadcrumb navigation trail according to user navigation of web pages at the Website, setting a time stamp corresponding to the breadcrumb navigation trail and storing the time stamp at the client, determining whether a time interval between the time stamp and a time corresponding to a subsequent downloaded web page exceeds a threshold, and enabling resumption of navigation according to the breadcrumb navigation trail by enabling downloading of a web page according to navigation information of a last breadcrumb in the breadcrumb navigation trail and displaying the breadcrumb navigation trail on the downloaded web page if the time interval exceeds the threshold.

According to a further embodiment of the present invention, there is provided a program storage device, tangibly embodying a program of instructions executable by the machine to perform a dynamic client-side breadcrumbing method for improving navigation of a plurality of web pages within a Website, the method comprising the step of: storing breadcrumbs associated with web pages downloaded to a web browser from a web server associated with the Website at a client, the breadcrumbs including navigation information associated with downloaded web pages and forming a breadcrumb navigation trail according to user navigation of the web pages within the Website; setting a time stamp corresponding to the breadcrumb navigation trail and storing the time stamp at the client; downloading a subsequent web page and retrieving the time stamp corresponding to the breadcrumb navigation trail stored at the client; determining whether a time interval between the time stamp and a time corresponding to the subsequent downloaded web page exceeds a threshold; and enabling resumption of navigation according to the breadcrumb navigation trail by enabling downloading of a web page according to navigation information of a last breadcrumb in the breadcrumb navigation trail and displaying the breadcrumb navigation trail on the downloaded web page if the time interval exceeds the threshold.

According to yet a further still a further embodiment of the present invention, there is provided a breadcrumbing engine to be embedded into a plurality of web pages within a Website for execution at a client web browser for improving navigation of the plurality of web pages within the Website, the breadcrumbing engine comprising: mechanism for generating a breadcrumb for each web page downloaded to a web browser associated with a client from a web server associated with the Website, the generated breadcrumb including navigation information for each downloaded web page; mechanism for storing breadcrumbs associated with web pages downloaded to the web browser at the client; mechanism for updating the stored breadcrumbs with the generated breadcrumb to form a breadcrumb navigation trail of breadcrumbs associated with navigation of the web pages at the Website; and mechanism for displaying the breadcrumb navigation trail on each downloaded web page for user selection.

According to still a further embodiment, there is provided a breadcrumbing engine to be embedded into a plurality of web pages within a Website for execution at a client web browser for improving navigation of the plurality of web pages within the Website, the breadcrumbing engine comprising: mechanism for storing breadcrumbs associated with web pages downloaded to a web browser from a web server associated with the Website, the breadcrumbs including navigation information associated with downloaded web pages and forming a breadcrumb navigation trail according to user navigation of web pages at the Website; mechanism for setting a time stamp corresponding to the breadcrumb navigation trail and storing the time stamp at the client; mechanism for determining whether a time interval between the time stamp and a time corresponding to a subsequent downloaded web page exceeds a threshold; and mechanism for enabling resumption of navigation according to the breadcrumb navigation trail by enabling downloading of a web page according to navigation information of a last breadcrumb in the breadcrumb navigation trail and displaying the breadcrumb navigation trail on the downloaded web page if the time interval exceeds the threshold.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION OF THE PREFERRED EMBODIMENT OF THE INVENTION

The present invention is directed to method and system for dynamically generating and maintaining a client-side breadcrumb navigation trail for improving navigation of a plurality of web pages within a Website.

Figure 1:
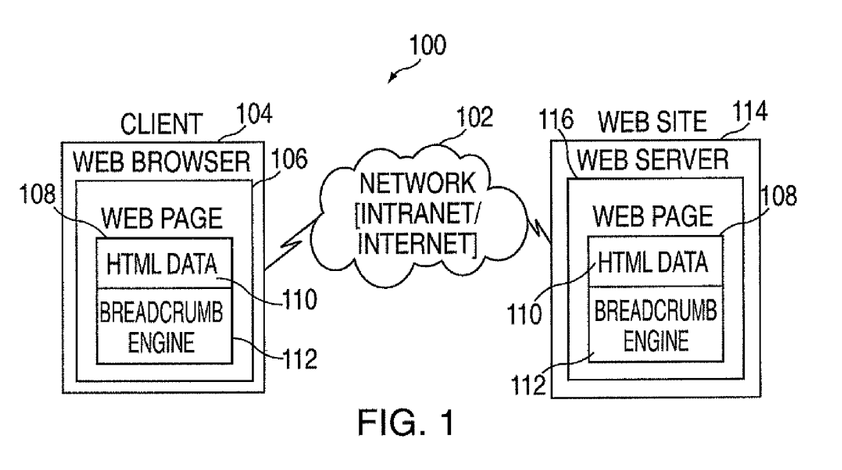
FIG. 1 is an exemplary block diagram of a breadcrumb navigation system according to the present invention.

FIG. 1 is an exemplary block diagram of a breadcrumb navigation system 100 according to the present invention. In the breadcrumb navigation system 100, Website 114 comprises a web server 116, which in turn maintains web pages 108. Although the breadcrumb navigation system 100 depicts only one web server 116 for simplicity, it is contemplated that the Website 114 may comprise a plurality of web servers, each comprising a plurality of web pages, for servicing client requests. According to the breadcrumb navigation system 100, the web server 116 integrates (or embeds) a breadcrumb engine 112 into web page 108, which includes HTML data 110. The web server 116 of Website 114 is interconnected via a communications network 102 to client 104. The client 104 comprises a web browser 106 for displaying the web page 108 transmitted by the web server 116.

In operation, a user of client 104 utilizes the web browser 106 for transmitting a request for a web page 108, which is identified by a Uniform Resource Locator (i.e., "URL"), over the communications network 102 to web server 114. In response to the request, the web server 116 services the request by transmitting the web pages 108 identified by the URL to the web browser 106, which displays the HTML data 110 to the user and executes the integrated (or embedded) breadcrumb engine 112. The breadcrumb engine is preferably implemented using JavaScript scripting language developed by Netscape Communications Corp. or JScript developed by Microsoft Corp. Alternatively, other scripting tools may be easily be implemented according to the teachings of the present invention. According to the present invention, the breadcrumb navigation system 100 utilizes conventional communications protocols, e.g., HyperText Transfer Protocol (i.e., "HTTP"), for communications between the web server 116 and client 104 over communications network 102. The breadcrumb engine 112 enhances navigation within the Website 114 by dynamically generating, maintaining and displaying a client-side breadcrumb navigation trail, and resuming navigation according to the client-side breadcrumb navigation trail at the client 104, as particularly illustrated in FIGS. 2–5 herein below.

Figure 2:
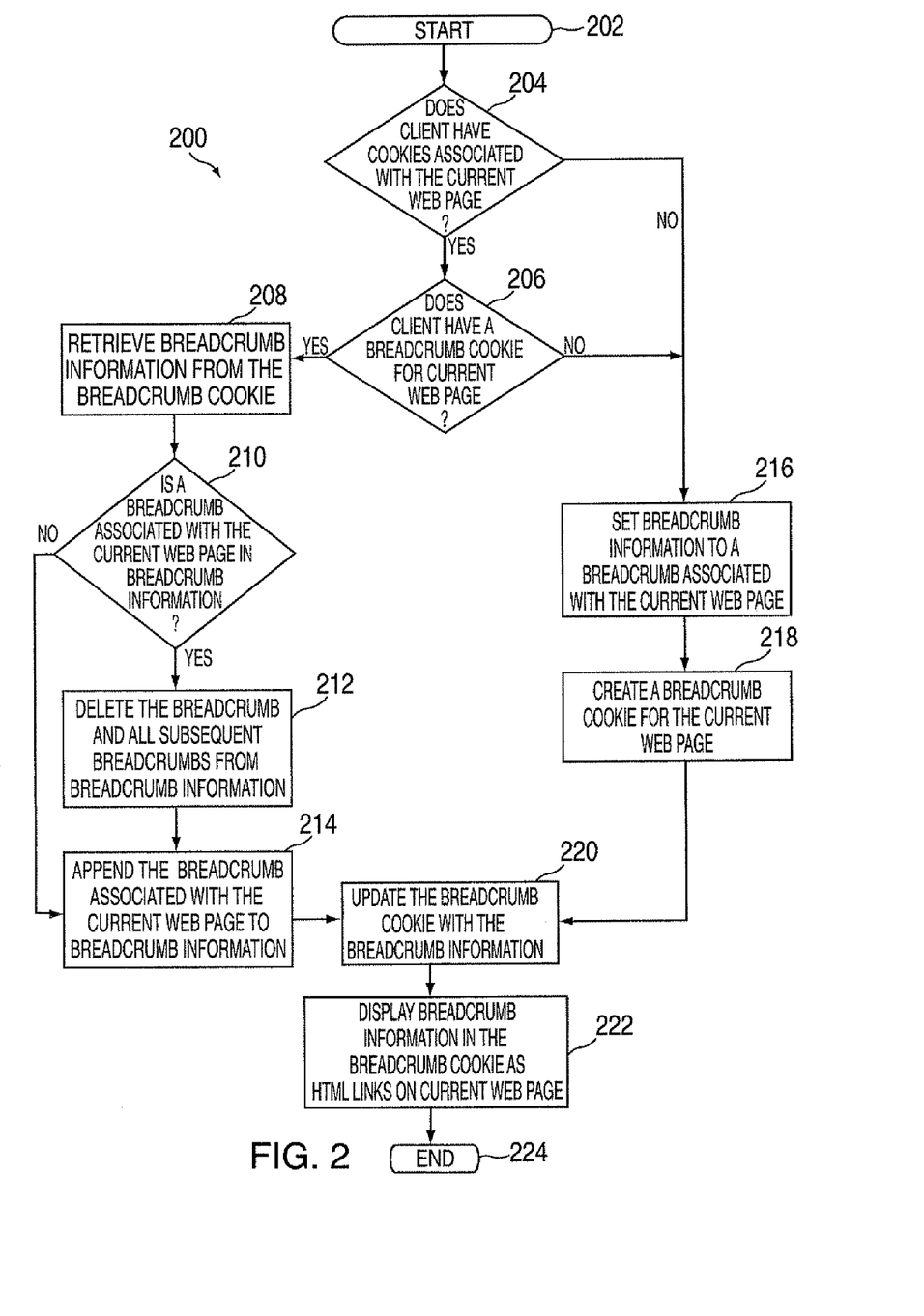
FIG. 2 is an exemplary embodiment of a method flowchart for dynamically generating and maintaining a client-side breadcrumb navigation trail according to the present invention.

FIG. 2 is an exemplary embodiment of method flowchart 200 for dynamically generating and maintaining a client-side breadcrumb navigation trail according to the present invention. It is assumed at this point that the client 104 has requested the web page 108 and the web server 116 has serviced the request by transmitting the web page 108 to the client's web browser 106, which has executed the breadcrumb engine 112. Since the web page 108 is currently displayed by the client's web browser, it will be referred to as the current web page in the following description of FIG. 2. The breadcrumb engine 112 of FIG. 1 executes the methodology depicted in flowchart 200. A JavaScript function update_breadcrumb_navigation trail( ) depicted in Table 2 below, illustrates a sample JavaScript code for implementing the method flowchart 200. The functions is executed within the HTML data 110 by the following function call: update_breadcrumb_navigation_trail("breadcrumb_cookie", "remove" document.forms[0].bctitle.value, document.location). The first argument, "breadcrumb_cookie", is a desired name for a client-side cookie that will maintain the breadcrumbs in the breadcrumb navigation trail. One skilled in the art will appreciate that other means for maintaining the breadcrumb navigation trail at the client may be utilized, such as a file or other persistent storage. The second argument, "remove", allows removing a breadcrumb and all subsequent breadcrumbs from the breadcrumb navigation trail if a breadcrumb associated with the current page already appears in the trail. If desired, the breadcrumb navigation trail may maintain all breadcrumbs regardless of whether a breadcrumb already appears in the breadcrumb navigation trail. The third argument, documentforms[0].bctitle.value, is comprised of a pre-built document object, which belongs to a set of pre-existing objects known as the "Document Object Model" (i.e., "DOM") for allowing JavaScript to manipulate the current web page, i.e., such as accessing an HTML form tag within the web page, and the HTML form tag that is included in the current web page for defining an invisible title (i.e., not displayed by the web browser) for the current web page. An exemplary hidden HTML input form tag is illustrated in Table 1 below. The last argument, document.location, is a URL for the current web page. The third and fourth arguments define the breadcrumb in the breadcrumb navigation trail, which is illustrated below with reference to FIG. 2.

Table 1 particularly illustrates an exemplary hidden HTML form tag for defining an invisible title for a web page according to the present invention.

TABLE 1

```
<form>
<input type=hidden name=bctitle value="page3">
</form>
```

The method for dynamically generating, and maintaining a client-side breadcrumb navigation trail starts at step 202 of FIG. 2. At step 204, it is determined whether the client 104 has cookies associated with the current web page (i.e., web page 108). It should be noted that a web page may have a plurality of cookies associated with it. If the cookies associated with the current page do not exist at the client 104, the method continues at step 216. If cookies associated with the current page exist at the client 104, at step 206 it is determined whether the client 104 has a breadcrumb cookie for the current web page. If the cookies for the current web page or the breadcrumb cookie for the current web page do not exist, then at step 216 breadcrumb information is set to a breadcrumb associated with the current web page. Then, at step 218 a breadcrumb cookie for the current web page is created, and the method continues at step 220 described hereinafter. If the breadcrumb cookie exists, breadcrumb information is retrieved from the breadcrumb cookie at step 208. The breadcrumb cookie maintains the breadcrumb navigation trail in the following exemplary fashion: "breadcrumb_cookie=bct=page1bcu-www.page1.htmbct=page2bcu=www.page2.htmbct=page3bcu=www.page3.htm;". The bct corresponds to the title of the breadcrumb to be displayed and the bcu corresponds to the URL of the breadcrumb to be displayed. Thus, the breadcrumb information comprises the consecutive bct-bcu pairs for breadcrumbs in the breadcrumb navigation trail. At step 210, it is determined whether a breadcrumb associated with the current web page is in the breadcrumb information. If the breadcrumb associated with the current web page is found in the breadcrumb information, the breadcrumb and all subsequent breadcrumbs are deleted from the breadcrumb information at step 212 and the method continues to step 214. However, if the breadcrumb is not found in the breadcrumb information at step 210, then at step 214 the breadcrumb for the current web page is appended to the breadcrumb information. At step 220, the breadcrumb information is written into the breadcrumb cookie for the current web page. At step 222, the breadcrumb information in the breadcrumb cookie is displayed on the current web page as HTML links in accordance with the method flowchart of FIG. 3, which is described hereinafter. At step 224, the method for dynamically generating and maintaining a client-side breadcrumb navigation trail ends.

Table 2 particularly illustrates an exemplary JavaScript function for dynamically generating and maintaining a client-side breadcrumb navigation trail according an embodiment of the present invention.

TABLE 2

```
function update_breadcrumb_navigation_trail(cookie_name, parm, bctitle, bcurl) {
// See whether this page in the breadcrumb cookie, then display the breadcrumbs.
// If parm is "remove" and current page is in the cookie, delete this page and subsequent pages.
// Add this page to the breadcrumb cookie.
    cookie_text"";
    // check whether there are cookies
    if (document.cookie.length>0) {
        spot = document.cookie.indexOf(cookie_name+"=");
        // do we have this cookie
        if (spot>-1) {
            // get cookie text
            end = document.cookie.indexOf(";", spot);
            if (end==-1) {
                end = document.cookie.length;
            }
            cookie_text = document.cookie.substring(spot+cookie_name.length+1, end);
            spot=cookie_text.indexOf("bct="+bctitle);
            // if parm is remove and this page is already there, remove it and anything after it.
            if (parm=="remove" && spot>-1) {
                if(spot==0) {
                    cookie_text="";
                }
                else {
                    cookie_text = cookie_text.substr(0,spot);
                }
            }
        }
    }
    // add current page to cookie
    cookie_text=cookie_text+"bct="+bctitle+"bcu="+bcurl;
    document.cookie= cookie_name+"="+cookie_text;
    display_breadcrumb_navigation_trail(cookie_name);
}
```

Figure 3:
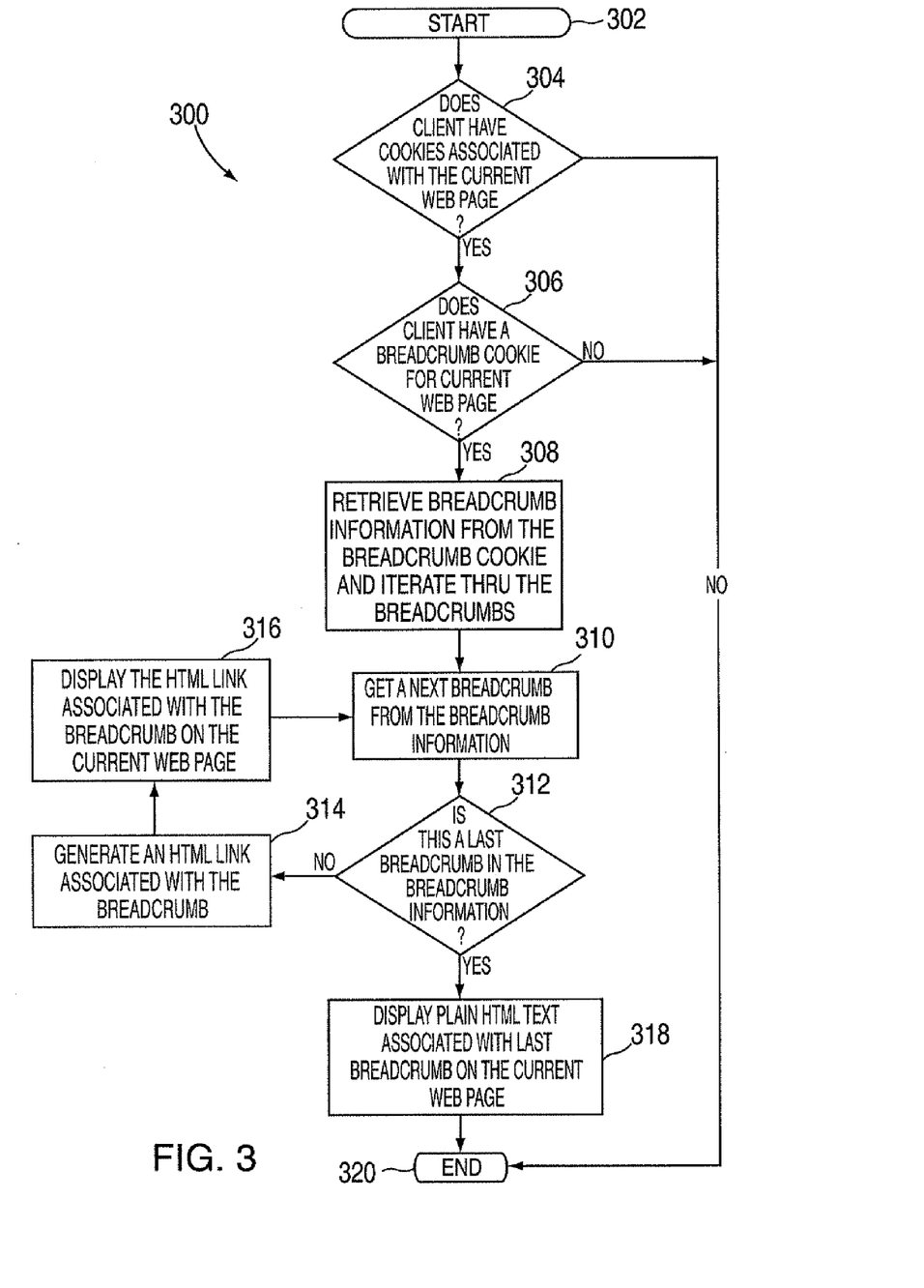
FIG. 3 is an exemplary method flowchart for dynamically displaying the client-side breadcrumb navigation trail generated in FIG. 2 according to the present invention.

FIG. 3 is an exemplary method flowchart 300 for dynamically displaying the client-side breadcrumb navigation trail generated in FIG. 2 according to the present invention. Once again, it is assumed at this point that the client 104 has requested the web page 108 and the web server 116 has serviced the request by transmitting the web page 108 to the client's web browser 106, which has executed the breadcrumb engine 112. Furthermore, since the web page 108 is currently displayed by the client's web browser, it will be referred to as the current web page in the following description of FIG. 3. The flowchart 300 is part of the breadcrumb engine 112 of FIG. 1. A JavaScript function display_breadcrumb_navigation_trail( ) depicted in Table 3 below, illustrates a sample JavaScript code for implementing the method flowchart 300. The function is executed by a call from function update_breadcrumb_navigation_trail( ): display_breadcrumb_navigation_trail("breadcrumb_cookie").

The method for dynamically displaying the client-side breadcrumb navigation trail generated in FIG. 2 starts at step 302 of FIG. 3. At step 304, it is determined whether the client 104 has cookies associated with the current web page. If cookies associated with the current web page do not exist, then display method ends at step 320. If cookies associated with the current page exist at the client 104, at step 306 it is determined whether the client 104 has a breadcrumb cookie for the current web page. If the breadcrumb cookie does not exist, then the display method likewise ends at step 320. However, if the breadcrumb cookie for the current web page exists, then at step 308 breadcrumb information from the breadcrumb cookie is retrieved and breadcrumbs in the breadcrumb information iterated at step 310–316. At step 310, a breadcrumb from the breadcrumb information is retrieved. At step 312, it is determined whether this breadcrumb is a last breadcrumb in the breadcrumb information. If, the breadcrumb is not the last breadcrumb, then at step 314 an HTML link associated with the retrieved breadcrumb is generated. At step 316, the generated link is displayed on the current web page by writing the HTML link into the HTML data 110 of the current web page (i.e., web page 108). The iteration of the breadcrumb information continues until it is determined that the last breadcrumb is retrieved from the breadcrumb information at step 312. At step 318, the last breadcrumb is displayed as placing HTML text (i.e., not an HTML link), since the current web page is the last breadcrumb in the breadcrumb information. At step 320, the display method ends.

Table 3 particularly illustrates an exemplary JavaScript function for dynamically displaying the client-side breadcrumb navigation trail according to the present invention.

gation according to the generated client-side breadcrumb navigation trail according to the present invention. As before, it is assumed that at this point the client 104 has requested the web page 108 and the web server 116 has serviced the request by transmitting the web page 108 to the client's web browser 106, which has executed the breadcrumb engine 112. Since the client's web browser currently is displaying the web page 108, it will be referred to as the current web page in the following description of FIG. 4. This embodiment of flowchart 400 replaces the embodiment of the flowchart of FIG. 2 as part of the breadcrumb engine 112 of FIG. 1. A JavaScript function update_breadcrumb_navigation_trail( ) depicted in Table 4 below, illustrates a sample JavaScript code for implementing the method flowchart 400. This function is executed in like fashion to the function illustrated in Table 2 and described with regard to FIG. 2.

Figure 4:
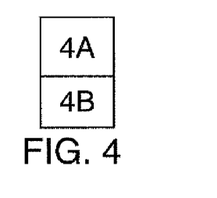
FIG. 4 is another exemplary embodiment of a method flowchart for dynamically generating and maintaining a client-side breadcrumb navigation trail, and resuming navigation according to the generated client-side breadcrumb navigation trail according to the present invention.
Figure 4A:
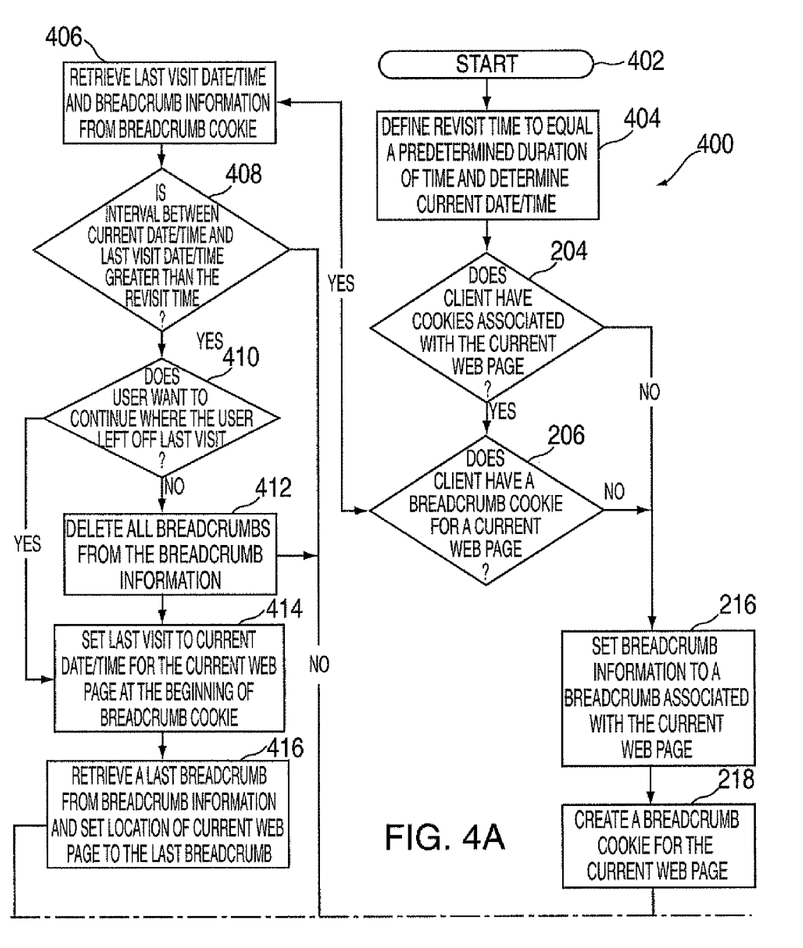
Figure 4B:
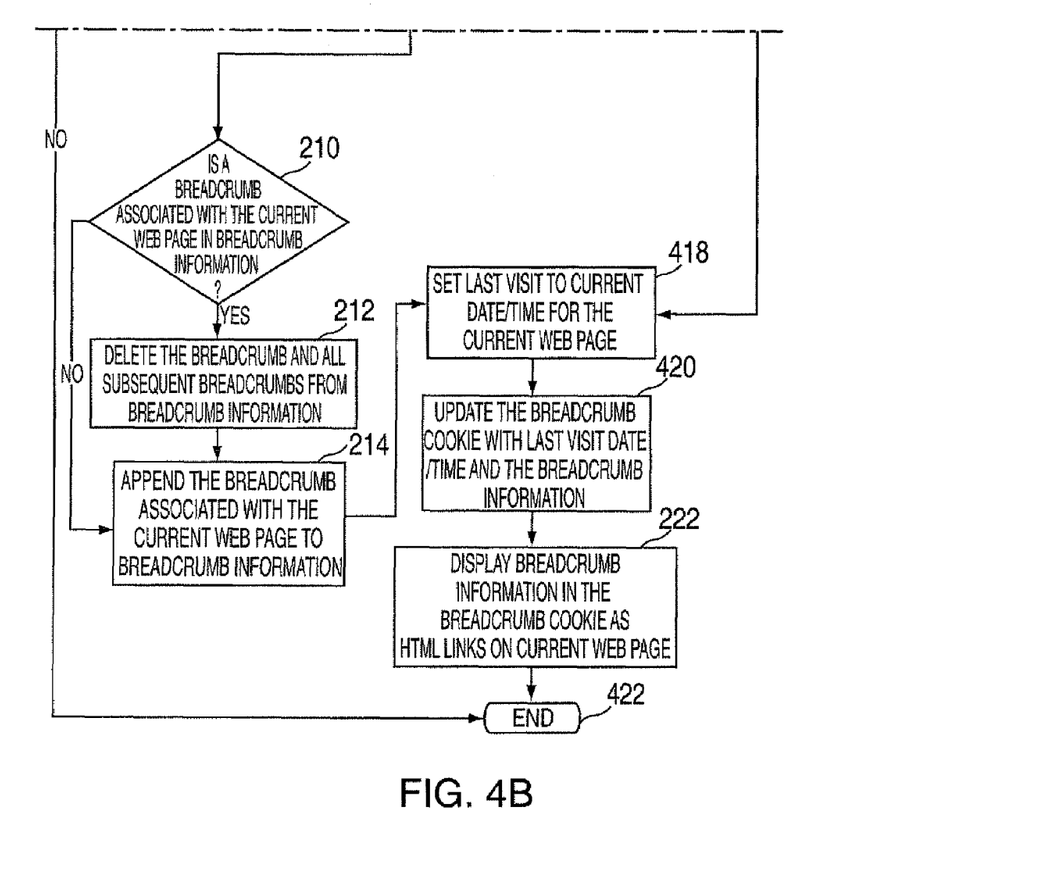

The embodiment of the method for dynamically generating and maintaining a client-side breadcrumb navigation trail, and resuming navigation according to the generated client-side breadcrumb navigation trail, starts at step 402 of FIG. 4. At step 404 a revisit time is defined in the current web page, which designates a period of time after which a user returning to the web page will be prompted whether the user would like to resume navigation according to the client-side breadcrumb navigation trail dynamically generated and maintained during the user's prior visit to the web page. Furthermore, at step 404 a current date and time are determined. At step 204, it is determined whether the client 104 has cookies associated with the current web page. If there are no cookies associated with the current page at the client 104, the method continues at step 216. If cookies associated with the current page exist at the client 104, at step 206 it is determined whether the client 104 has a breadcrumb cookie for the current web page. If the cookies for the current web page or the breadcrumb cookie for the

TABLE 3

```
function display_breadcrumb_navigation_trail(cookie_name) {
    // check whether there are cookies
    if (document.cookie.length>0) {
        spot = document.cookie.indexOf(cookie_name+"=");
        // check whether there is this cookie
        if(spot>-1) {
            // get cookie text
            end = document.cookie.indexOf(";", spot);
            if (end==-1) end = document.cookie.length;
            cookie_text = document.cookie.substring(spot, end);
            // Loop thru the cookie text, display all titles except last title as HTML links
            // Display last title as plain HTML text
            spot = cookie_text.indexOf("bct=");
            while (spot>-1) {
                // get title
                end = cookie_text.indexOf("bcu=",spot+4);
                bctitle = cookie_text.substring(spot+4,end);
                spot = cookie_text.indexOf("bct=",end+4);
                if(spot==-1) {
                    document.writeln(">"+bctitle);
                }
                else {
                    bcurl=cookie_text.substring(end+4, spot);
                    document.writeln(' > <a href="'+bcurl+'">'+bctitle+'</a>');
                }
            }
        }
    }
}
```

FIG. 4 is another exemplary embodiment of a method flowchart for dynamically generating and maintaining a client-side breadcrumb navigation trail, and resuming navigation current web page do not exist, then at step 216 the breadcrumb information is set to a breadcrumb associated with the current web page. Then, at step 218 a breadcrumb cookie for the current web page is created, and the method continues to step 418. At step 418, a last visit is set to the current date and time determined at step 404. The breadcrumb cookie is updated with the last visit date and time and with breadcrumb information at step 420, and at step 422 the breadcrumb information in the breadcrumb cookie is displayed as HTML links according to the method of FIG. 3. At step 422, the method for dynamically generating and maintaining a client-side breadcrumb navigation trail, and resuming navigation according to the client-side breadcrumb navigation trail, ends.

However, if the breadcrumb cookie exists at step 206 of FIG. 4, then the last visit date and time and breadcrumb information are retrieved from the breadcrumb cookie at step 406. At step 408, it is determined whether the user had been away from the web page for a designated period of time (i.e., revisit time date and time) defined at step 404. This determination is accomplished by subtracting the last visit date and time from the current date and time and determining whether this result is greater than the revisit time. If the result is greater than the revisit time, the user is prompted at step 410 regarding whether the user would like to resume navigation according to the generated client-side breadcrumb navigation trail from the last visit. If the user chooses to continue navigation, at step 414 the last visit date and time is set to current date and time and the breadcrumb cookie is updated with this time. Then, at step 416 the last breadcrumb is retrieved from the breadcrumb information and a location for the current web page is set to the last breadcrumb (i.e., the URL associated with the last breadcrumb), thereby resulting in a request being transmitted to the web server 116 for the web page identified by the URL, which is serviced by the server 116 and transmitted to the web browser 106 for display. Thereafter, the method ends at step 422. However, if the determination at step 408 reveals that the user has not been away from the web page for the designated period of time, the method continues at step 210. Furthermore, if the user at step 410 does not want to resume navigation according to the client-side breadcrumb navigation trail from the last visit, then at step 412 all breadcrumbs are deleted from the breadcrumb information. Thereafter, the method continues to step 210. At step 210, it is determined whether a breadcrumb associated with the current web page is in the breadcrumb information. If the breadcrumb is not in the breadcrumb information, the method continues at step 214. If the breadcrumb is in breadcrumb information, at step 212 the breadcrumb and subsequent breadcrumb are deleted from the breadcrumb information. At step 214, the breadcrumb associated with the current web page is appended to the breadcrumb information. Then the method continues from step 418 to step 420 to step 222 and finally to step 422, as described above.

Table 4 particularly illustrates an exemplary JavaScript function for dynamically generating and maintaining a client-side breadcrumb navigation trail, and resuming navigation according to the client-side breadcrumb navigation trail, according an other embodiment of the present invention.

TABLE 4

```
function update_breadcrumb_navigation_trail(cookie_name, parm, bctitle, bcurl) {
// See whether this page in the breadcrumb cookie, then display the breadcrumbs.
// If parm is "remove" and current page is in the cookie, this page and subsequent pages.
// Add this page to the breadcrumb cookie.
// Add current date and time at the beginning of the breadcrumb cookie
// Check this date and time to see whether user has been away for a designated amount of time
// If user has been away longer, prompt user whether to resume navigation where user left off.
    today = new Date( );
    revisit_time = 1000 *60 *3; //3 min.: 1000 milliseconds * 60 sec./min. * 3
    cookie_text="";
    // check whether there are cookies
    if (document.cookie.length>0) {
        spot = document.cookie.indexOf(cookie_name+"=");
        // do we have this cookie
        if (spot>-1) {
            // get last visit date and time
            spot = document.cookie.indexOf("lastvisit=");
            end = document.cookie.indexOf("bct=",spot);
            lastvisit = new Date (document.cookie.substring(spot+10,end));
            // get cookie text
            spot = end; //skip past date and time information
            end = document.cookie.indexOf(";", spot);
            if (end==-1) {
                end = document.cookie.length;
            }
            cookie_text = document.cookie.substring(spot+cookie_name.length+1, end);
            // determine whether past revisit time and prompt to resume where left off.
            if(today - lastvisit > revisit_time) {
                if(confirm("Do you want to resume where you left off last time?")) {
                    document.cookie = cookie_name+"=lastvisit="+today+cookie_text;
                    spot = cookie_text.lastIndexOf("bcu=");
                    document.location=cookie_text.substring(spot+4);
                    return;
                }
                else {
                    cookie_text="";
                }
            }
        }
        // check whether this page already in the list
        spot=cookie_text.indexOf("bct="+bctitle)
        // if parm is remove and this page is already there, remove it and anything after it.
        if (parm=="remove" && spot>-1) {
```

TABLE 4-continued

```
                if (spot==0) {
                    cookie_text="";
                }
                else {
                    cookie_text = cookie_text.substr(0,spot);
                }
            }
        }
    }
    // add date and time and current page to cookie
    cookie_text=cookie_text+"bct="+bctitle+"bcu="+bcurl;
    document.cookie= cookie_name+"=lastvisit="+today+cookie_text;
    display_breadcrumb_navigation_trail(cookie_name);
}
```

Figure 5:
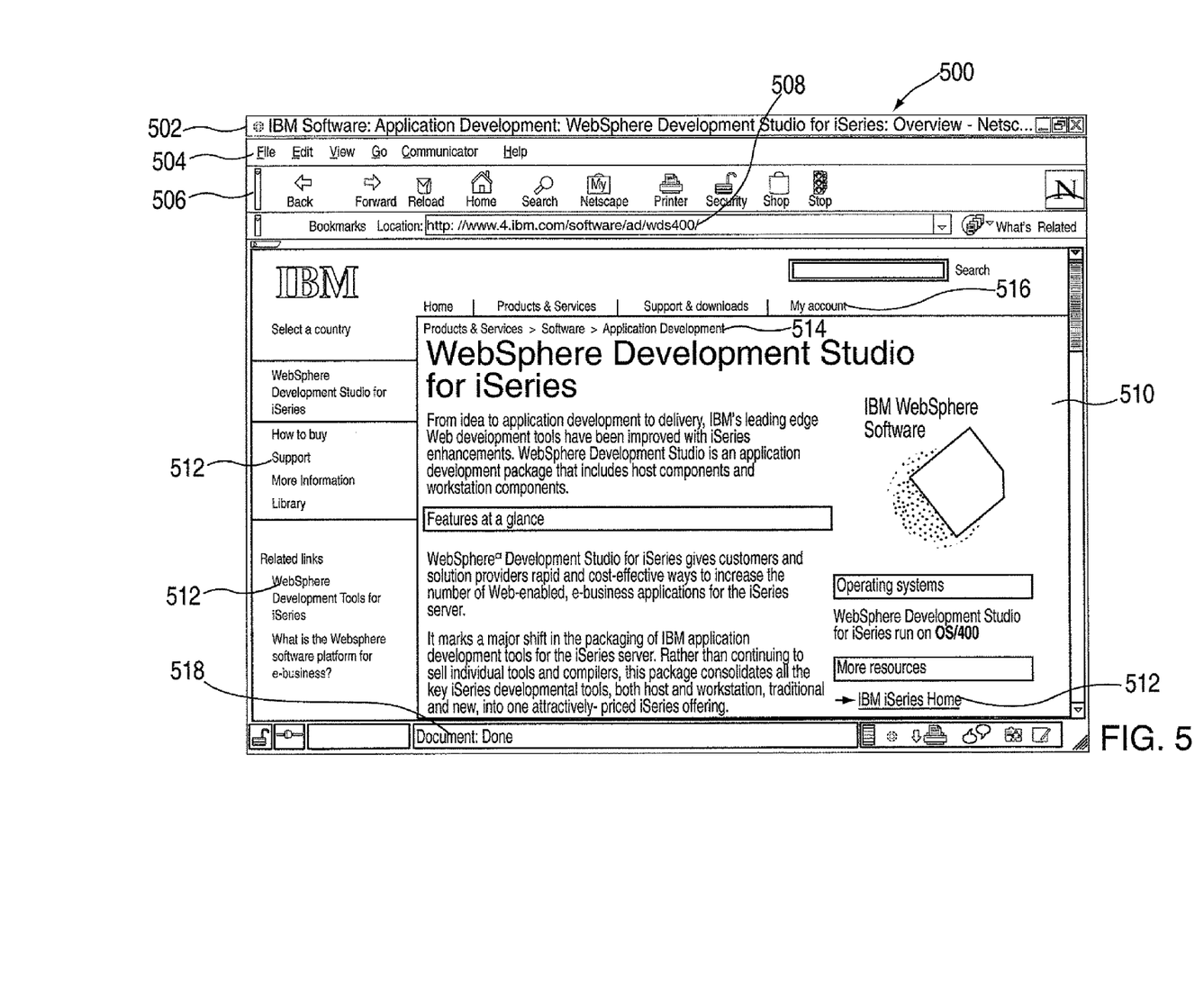
FIG. 5 is an exemplary web browser window depicting the generated client-side breadcrumb navigation trail according to FIGS. 1–4.

FIG. 5 is an exemplary web browser window 500 depicting the dynamically generated and maintained client-side breadcrumb navigation trail 514 according to FIGS. 1–4. As depicted in FIG. 5, the web browser window 500 includes a title bar 502, a menu 504, a plurality of buttons 506, a location input field 508 and a status bar 518, all of which perform a variety of functions. The web browser window 500 is produced by a Netscape Communicator web browser of Netscape Communications. Other web browsers, such as Internet Explorer by Microsoft Corporation, may likewise be implemented to take advantage of the present invention. The web browser window 500 displays a web page 510 that includes a plurality of HTML links 512, a breadcrumb navigation trail 514 and a plurality of tabs 516 for navigation within an IBM Website (i.e., identified by www.IBM.com), comprising a plurality of web servers and web pages. The displayed web page 510 is downloaded by the web browser 106 from the web server 116 of FIG. 1 and provides a user with information content. The user interacts with the browser window and the displayed web page by using a pointing device (e.g., a mouse). According to the present invention, the displayed web page 510 includes HTML data 110 for providing information content to the user and a breadcrumb engine 112 for dynamically generating and maintaining a client-side breadcrumb navigation trail, and resuming navigation according to the client-side breadcrumb navigation trail.

While the invention has been particularly shown and described with respect to preferred embodiments thereof, it will be understood by those skilled in the art that the foregoing and other changes in form and details may be made therein without departing from the spirit and scope of the invention, as particularly embodied in the appended claims.

Having thus described our invention, what we claim as new and desire to secure by Letters Patent is:

1. A dynamic client-side breadcrumbing method for improving navigation of a plurality of web pages within a Website, the method comprising:

embedding a browser script into a web page being downloaded to a web browser at a client from a web server associated with the Website, said browser script executed by said web browser for performing the steps of:

(a) programmatically generating and storing breadcrumbs associated with web pages downloaded to the web browser from the web server associated with the Website at the client, the breadcrumbs including navigation information comprising a URL associated with downloaded web pages and forming a breadcrumb navigation trail of URLs associated with the web pages visited at the Website without downloading from said web server any information describing a web page's location in a web site hierarchy or maintaining web page relationships in the web pages themselves;

(b) setting a time stamp corresponding to the breadcrumb navigation trail and storing the time stamp at the client;

(c) downloading a subsequent web page and retrieving the time stamp corresponding to the breadcrumb navigation trail stored at the client;

(d) determining whether a time interval between the time stamp and a time corresponding to the subsequent downloaded web page exceeds a threshold, wherein the threshold was defined within the browser script of each downloaded web page; and (e) enabling resumption of navigation according to the breadcrumb navigation trail by enabling downloading of a web page according to navigation information of a last breadcrumb in the breadcrumb navigation trail and displaying the breadcrumb navigation trail on the downloaded web page if the time interval exceeds the threshold, wherein said displayed breadcrumb navigation trail reflects a correct order of a user's navigation through an information space of the Website.

2. The method according to claim 1, wherein the navigation information includes a title and a uniform resource locator for each downloaded web page.

3. The method according to claim 1, further comprising a step of creating a client-side cookie to store the breadcrumbs associated with web pages downloaded to the web browser and the time stamp corresponding to the breadcrumb navigation trail.

4. The method according to claim 1, the method further comprising a step of prompting a user regarding whether the user would like to resume navigation according to the breadcrumb navigation trail.

5. The method according to claim 4, wherein if the user chooses to resume navigation according to the breadcrumb navigation trail, the method further comprises a step of setting the time stamp associated with the breadcrumb navigation trail to the time associated with downloading of the web page according to navigation information of a last breadcrumb in the breadcrumb navigation trail and storing the time stamp at the client.

6. The method according to claim 4, wherein if the user chooses not to resume navigation according to the breadcrumb navigation trail, the method further comprises the steps of:

deleting all breadcrumbs stored at the client and storing a breadcrumb generated for the subsequent downloaded web page at the client to form a new breadcrumb navigation trail;

setting the time stamp to the time associated with the subsequent downloaded web page and storing the time stamp at the client; and displaying the new breadcrumb navigation trail on the subsequent downloaded web page.

7. A dynamic client-side breadcrumbing system for improving navigation of a plurality of web pages within a Website, the system comprising:

(a) a web server associated with the Website transmitting web pages requested by a client, each of the web pages having a browser script embedded therein by said web server; and (b) a web browser associated with the client downloading the web pages and executing the browser script the browser script for:

i) programmatically generating and storing breadcrumbs associated with web pages downloaded to the web browser from the web server associated with the Website at the client, the breadcrumbs including navigation information comprising a URL associated with downloaded web pages and forming a breadcrumb navigation trail of URLs associated with the web pages visited at the Website without downloading from said web server any information describing a web page's location in a web site hierarchy or maintaining web page relationships in the web pages themselves;

ii) setting a time stamp corresponding to the breadcrumb navigation trail and storing the time stamp at the client;

iii) determining whether a time interval between the time stamp and a time corresponding to a subsequent downloaded web page exceeds a threshold, wherein the threshold was defined within the browser script of each downloaded web page; and iv) enabling resumption of navigation according to the breadcrumb navigation trail by enabling downloading of a web page according to navigation information of a last breadcrumb in the breadcrumb navigation trail and displaying the breadcrumb navigation trail on the downloaded web page if the time interval exceeds the threshold, wherein said displayed breadcrumb navigation trail reflects a correct order of a user's navigation through an information space of the Website.

8. The system according to claim 7, wherein the navigation information includes a title and a uniform resource locator for each downloaded web page.

9. The system according to claim 7, wherein the breadcrumbing engine further creating a client-side cookie to store the breadcrumbs associated with the web pages downloaded to the web browser and the time stamp corresponding to the breadcrumb navigation trail.

10. The system according to claim 7, wherein the breadcrumbing engine further prompting a user regarding whether the user would like to resume navigation according to the breadcrumb navigation trail.

11. The system according to claim 10, wherein if the user chooses to resume navigation according to the breadcrumb navigation trail, the breadcrumbing engine further setting the time stamp associated with the breadcrumb navigation trail to the time associated with downloading of the web page according to navigation information of a last breadcrumb in the breadcrumb navigation trail and storing the time stamp at the client.

12. The system according to claim 10, wherein if the user chooses not to resume navigation according to the breadcrumb navigation trail, the breadcrumbing engine:

deleting all breadcrumbs stored at the client and storing a breadcrumb generated for the subsequent downloaded web page at the client form a new breadcrumb navigation trail;

setting the time stamp to the time associated with the subsequent downloaded web page and storing the time stamp at the client; and displaying the new breadcrumb navigation trail on the subsequent downloaded web page.

13. A computer readable program storage device, tangibly embodying a program of instructions executable by the machine to perform a dynamic client-side breadcrumbing method for improving navigation of a plurality of web pages within a Website, the method comprising the steps of:

embedding a browser script into a web page being downloaded to a web browser at a client from a web server associated with the Website, said browser script executed by said web browser for performing the steps of:

(a) programmatically generating and storing breadcrumbs associated with web pages downloaded to the web browser from the web server associated with the Website at the client, the breadcrumbs including navigation information comprising a URL associated with downloaded web pages and forming a breadcrumb navigation trail of URLs associated with the web pages visited at the Website without downloading from said web server any information describing a web page's location in a web site hierarchy or maintaining web page relationships in the web pages themselves;

(b) setting a time stamp corresponding to the breadcrumb navigation trail and storing the time stamp at the client;

(c) downloading a subsequent web page and retrieving the time stamp corresponding to the breadcrumb navigation trail stored at the client;

(d) determining whether a time interval between the time stamp and a time corresponding to the subsequent downloaded web page exceeds a threshold, wherein the threshold was defined within the browser script of each downloaded web page; and (e) enabling resumption of navigation according to the breadcrumb navigation trail by enabling downloading of a web page according to navigation information of a last breadcrumb in the breadcrumb navigation trail and displaying the breadcrumb navigation trail on the downloaded web page if the time interval exceeds the threshold, wherein said displayed breadcrumb navigation trail reflects a correct order of a user's navigation through an information space of the Website.

14. The program storage device according to claim 13, wherein the navigation information, includes a title and a uniform resource locator for each downloaded web page.

15. The program storage device according to claim 13, the method further comprising creating a client-side cookie to store the breadcrumbs associated with web pages downloaded to the web browser and the time stamp corresponding to the breadcrumb navigation trail.

16. The program storage device according to claim 13, the method further comprising a step of prompting a user regarding whether the user would like to resume navigation according to the breadcrumb navigation trail.

17. The program storage device according to claim 16, wherein if the user chooses to resume navigation according to the breadcrumb navigation trail, the method further comprises a step of setting the time stamp associated with the breadcrumb navigation trail to the time associated with downloading of the web page according to navigation information of a last breadcrumb in the breadcrumb navigation trail and storing the time stamp at the client.

18. The method according to claim 16, wherein if the user chooses not to resume navigation according to the breadcrumb navigation trail, the method further comprises the steps of:

deleting all breadcrumbs stored at the client and storing a breadcrumb generated for the subsequent downloaded web page at the client to form a new breadcrumb navigation trail;

setting the time stamp to the time associated with the subsequent downloaded web page and storing the time stamp at the client; and displaying the new breadcrumb navigation trail on the subsequent downloaded web page.

19. A browser script embodied on a computer readable medium to be embedded into a plurality of web pages within a Website, by a web server associated with the Website, for execution by a client web browser for improving navigation of the plurality of web pages within the Website, the browser script comprising:

(a) mechanism for generating and storing breadcrumbs associated with web pages downloaded to the web browser from the web server associated with the Website at the client, the breadcrumbs including navigation information comprising a URL associated with downloaded web pages and forming a breadcrumb navigation trail of URLs associated with the web pages visited at the Website without downloading from said web server any information describing a web page's location in a web site hierarchy or maintaining web page relationships in the web pages themselves;

(b) mechanism for setting a time stamp corresponding to the breadcrumb navigation trail and storing the time stamp at the client;

(c) mechanism for determining whether a time interval between the time stamp and a time corresponding to a subsequent downloaded web page exceeds a threshold, wherein the threshold was defined within the browser script of each downloaded web page; and (d) mechanism for enabling resumption of navigation according to the breadcrumb navigation trail by enabling downloading of a web page according to navigation information of a last breadcrumb in the breadcrumb navigation trail and displaying the breadcrumb navigation trail on the downloaded web page if the time interval exceeds the threshold, wherein said displayed breadcrumb navigation trail reflects a correct order of a user's navigation through an information space of the Website.

* * * * *